United States Patent [19]
Henneck et al.

[11] Patent Number: 5,269,173
[45] Date of Patent: Dec. 14, 1993

[54] FLAT BOTTOMED TANKS AND PROCESS TO DETECT LEAKAGES

[76] Inventors: Klaus Henneck, Heinrich-Stohr-Str. 13, 8832 Weissenburg; Hans Baumgartner, Friedrich-Kraus-Str., 8505 Rothenbach/Pegnitz, both of Fed. Rep. of Germany

[21] Appl. No.: 699,023

[22] Filed: May 13, 1991

[30] Foreign Application Priority Data

May 11, 1990 [DE] Fed. Rep. of Germany ......... 015190

[51] Int. Cl.$^5$ ............................................. G01M 3/04
[52] U.S. Cl. ..................... 73/49.2; 220/565; 220/468
[58] Field of Search ................. 73/40.5 R, 49.2 T, 40, 73/49.2 R; 340/605; 405/54; 220/468, 469, 565

[56] References Cited

U.S. PATENT DOCUMENTS

| | | | |
|---|---|---|---|
| 2,924,352 | 2/1960 | Santner | 73/49.2 |
| 3,383,863 | 5/1968 | Berry | 405/270 |
| 3,908,468 | 9/1970 | Katsuta et al. | 73/49.2 |
| 4,136,386 | 1/1979 | Peterson et al. | 73/40 |
| 4,206,632 | 6/1980 | Suzuki | 73/40.5 R |
| 4,270,049 | 5/1981 | Tanaka et al. | 250/227 |
| 4,404,516 | 9/1983 | Johnson, Jr. | 324/54 |
| 4,672,366 | 6/1987 | Butts | 340/605 |
| 4,916,939 | 4/1990 | Mogel | 73/49.2 |
| 4,920,786 | 5/1990 | Danielson | 73/49.2 |
| 4,939,833 | 7/1990 | Thomas | 73/49.2 |

FOREIGN PATENT DOCUMENTS

| | | | |
|---|---|---|---|
| 251045 | 6/1987 | European Pat. Off. | |
| 1084092 | 6/1960 | Fed. Rep. of Germany | |
| 333542 | 4/1985 | Fed. Rep. of Germany | |
| 3427964A1 | 1/1986 | Fed. Rep. of Germany | |
| 3539946 | 5/1987 | Fed. Rep. of Germany | |
| 1377519 | 9/1964 | France | 340/605 |
| 121413 | 9/1979 | Japan | 73/49.2 |
| 0045537 | 3/1983 | Japan | 340/605 |
| 1543156 | 3/1979 | United Kingdom | |

Primary Examiner—Hezron E. Williams
Assistant Examiner—Michael Brock
Attorney, Agent, or Firm—Dena Meyer Weker

[57] ABSTRACT

This invention relates to a system and process for monitoring flat bottomed tanks for leaks utilizing a sensor cable, barrier layer or film impermeable to the leaking medium and a compensation layer housing the sensor cable and on which the tank bottom is placed.

8 Claims, 2 Drawing Sheets

FLAT BOTTOMED TANKS AND PROCESS TO DETECT LEAKAGES

FIELD OF THE INVENTION

This invention relates to a system and process for monitoring flat bottomed tanks for leaks utilizing a sensor cable, barrier layer or film impermeable to the leaking medium and a compensation layer housing the sensor cable.

BACKGROUND OF THE INVENTION

In order to protect the environment as much as possible, it is indispensible to monitor tanks containing substances which are harmful to water, such as hydrocarbons, and other insidious leaks. When new tanks are designed, such a monitoring system should be designed into the new construction. Existing tank storage systems should be modified and subsequently fitted with adequate monitoring systems.

In a state of the art method, intermediate floors are welded into existing flat bottomed tanks. The chamber produced in this way is evacuated or kept at a pressure below atmospheric pressure. If a leakage occurs, it can be detected at an early stage by monitoring the pressure difference.

The state of the art solution, however, is rather complicated because the inner bottom must be of a very stable construction capable of withstanding high loads. When modifying existing flat bottomed tanks, first a bitumen layer has to be applied onto the tank bottom, then a first sheet metal floor is welded into the tank, followed by a second welded floor, leaving a chamber between the two. The latter floor has to be welded in because the primary tank bottom is susceptible to corrosion from outside and can therefore not be used to create the chamber. This process is very cost-intensive and technically complicated. A major shortcoming is the fact that the location of the leakage cannot be detected.

Furthermore, there is a state of the art process for detecting leaks wherein a sensor tube is laid out horizontally in relation to the tank bottom. The sensor tube is laid in a perforated protective tube and consists of a gas-permeable material. In certain time intervals, such as 24 hours, gas samples are taken and analyzed. This means, however, that the occurrence of a leakage is not immediately detected and thus it is not possible to trigger an alarm immediately. The gas analyses require complicated measuring instruments which are expensive and sometimes even unrealiable, because the gas samples often have to be conveyed over quite long distances, which may change their composition.

There is a need for a process for monitoring flat bottomed tanks for leakages. This process must allow for easy modification of existing tanks, must work reliably and localize a leakage without delay, upon its occurence. Furthermore, the measuring process should be as simple as possible.

SUMMARY OF THE INVENTION

The invention provides for a system and process to detect leaks in flat bottom tanks utilizing a sensor cable that is laid within a liquid permeable compensation layer that is delimited towards the outside by a barrier layer impermeable to the leaking medium.

The invention also provides a system for a flat bottomed tank to incorporate an inner floor and, in an area formed between the outer floor and the inner floor, a first layer consisting of bitumen, a barrier layer and on top of this a liquid-permeable layer, preferably consisting of porous bitumen, in which the sensor cable is laid out horizontally.

This inventive system may also be applied to existing flat bottomed tanks, which can be modified by the process provided either by installing the described layer construction within the tank and subsequently welding in an inner floor or by lifting the tanks and mounting the described layer construction underneath the existing tank bottom.

DETAILED DESCRIPTION OF THE INVENTION

The invention provides for a system to detect leaks in flat bottom tanks using a sensor cable that is laid within a compensation layer which is permeable to liquids.

The sensor cable used herein is a cable whose electrical properties change when in contact with the medium to be detected. The change of these electrical properties is displayed by suitable measuring instruments. These are, for instance, coaxial cables surrounded by an insulation layer consisting of microporous, expanded PTFE, which allows liquid hydrocarbons to pass through due to their low viscosity but which is impermeable to water. Sensor cables of this type are, for example, available from W. L. Gore & Associates, Inc., and sold under the trademark "LEAKLEARN." Construction and function of a preferable sensor cable is described in U.S. Pat. No. 4,206,632 herein incorporated by reference.

The measuring principle is based on the following effect: In a homogenous line terminated by a wave resistor there are virtually no reflections when a voltage impulse is applied. The wave resistance is dependent on the geometry and the dielectric constant of the insulation. When liquids penetrate the porous insulating material, they change the dielectric constant of the insulation and thus the wave resistance of the sensor cable at the wetted spot. As a consequence, the cable becomes nonhomogenous and the impulse sent is reflected. The time which elapses between sending and receiving the reflected impulse serves to determine the distance of the wetted spot from the display unit. The same measuring process serves to detect and localize a short circuit or a break in the cable. If the wave resistance of the cable decreases at one spot, the unit will trigger an alarm and display the location of the wetted area. In case of a break in the cable or a short circuit a fault signal will be given off and the location of the faculty spot will be displayed.

The invention can best be understood by reference to the accompanying figures.

Figure 1:
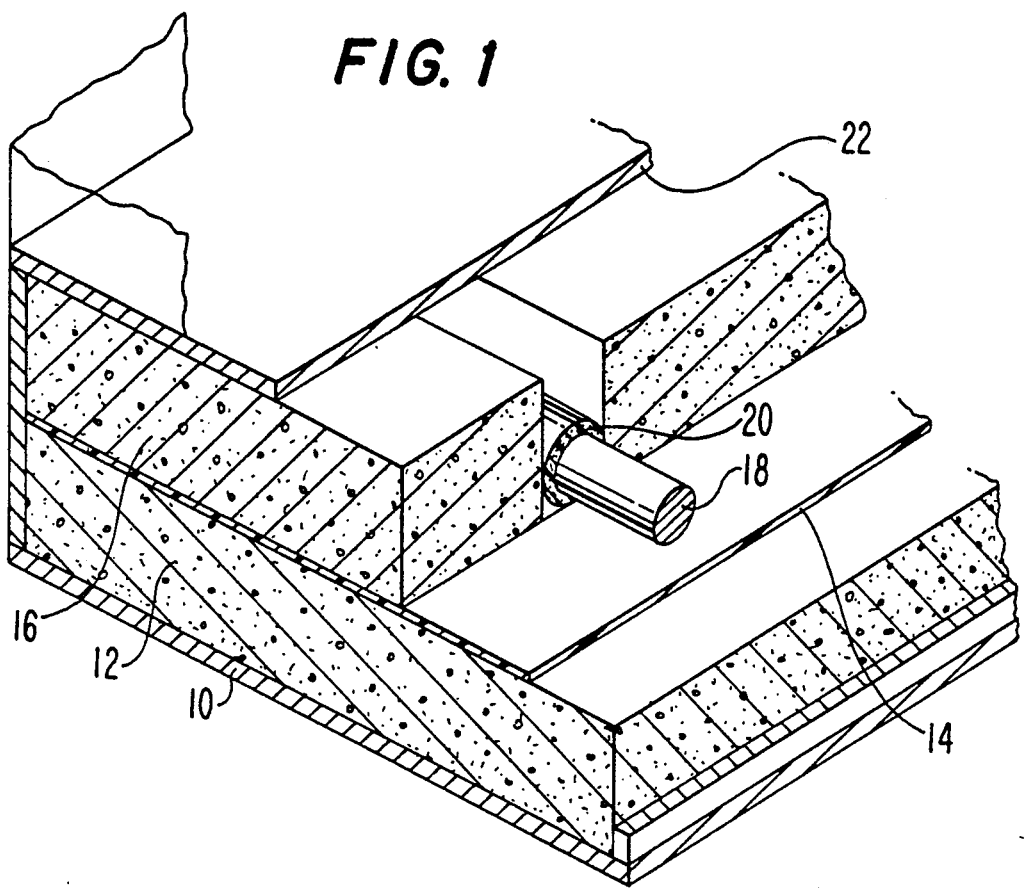
FIG. 1 is a schematic view of the layer construction between two floors within a flat bottomed tank.

FIG. 1 shows the layer construction within a flat bottomed tank. At first, a bitumen layer (special asphalt) 12 is applied onto the outer tank bottom 10. This layer is either covered by a film, which is impermeable to the leaking medium, or by a coating 14 which is capable of holding back the leaking medium at least for some time. A two-component epoxide has proven to be a suitable sealing agent. The film material to be preferred is polyethylene.

For modifications of existing flat bottomed tanks, applying a sealing agent or coating has proven more successful than laying out a film.

A liquid-permeable layer 16 is applied on top of the barrier layer 14. The liquid-permeable layer 16 preferably consists of drainage asphalt, in certain cases gravel is also suitable. The most important thing is to make sure that the layer can transport the leaking medium to the sensor cable.

The sensor cable 18 is arranged within a perforated protective tube 20 which is supported in grooves or canals formed in the compensation layer 16. These canals may, for instance, be formed by pieces of wood which are later removed.

Figure 2:
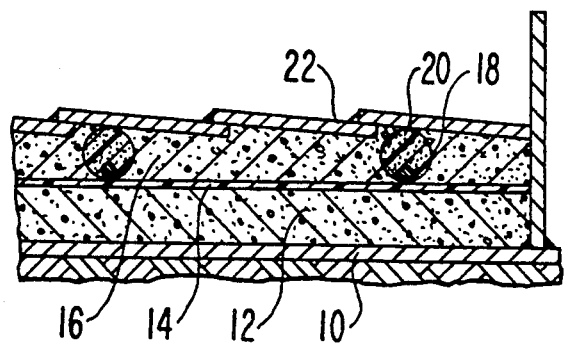
FIG. 2 is a schematic cross-section of the two floors within a flat bottomed tank with a segmentated intermediate floor.

The inner tank floor 22 is welded onto the compensation layer 16. The layer construction shown in FIG. 1 can also be incorporated into existing flat bottomed tanks. The intermediate floor 22 is welded in the form of several overlapping lengths, as shown in FIG. 2.

Figure 3:
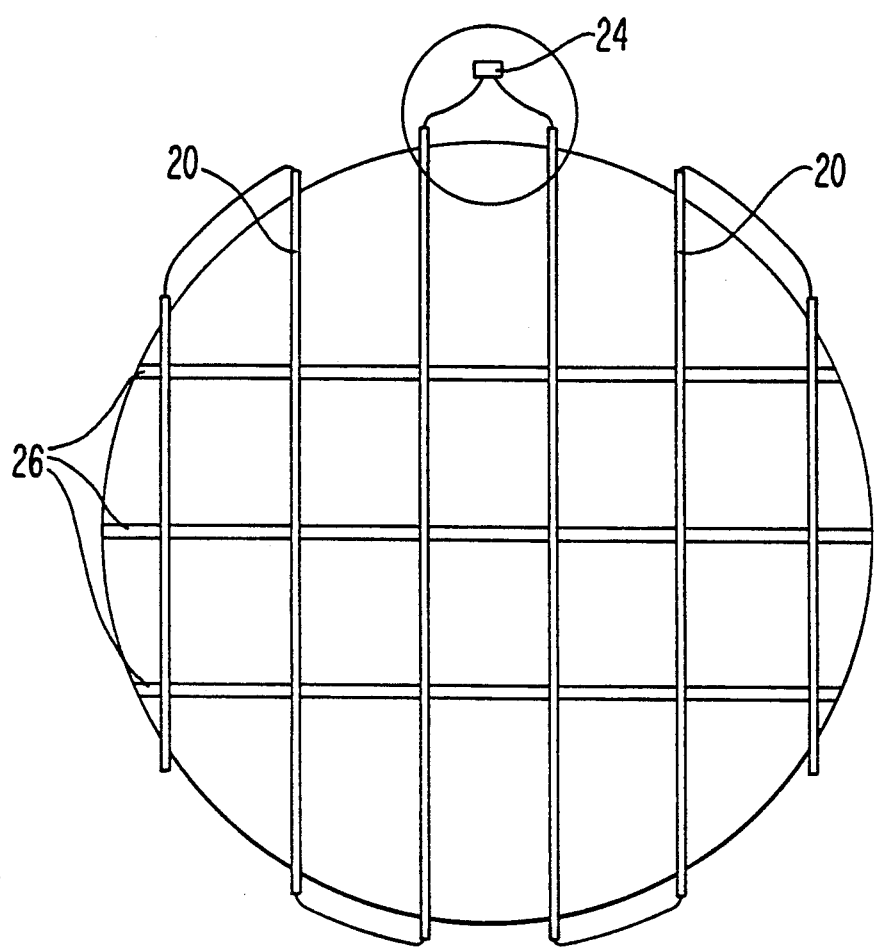
FIG. 3 shows the horizontal laying of a sensor cable in the foundation of a flat bottomed round tank.

FIG. 3 schematically shows how the sensor cable is laid in the foundation of a flat bottomed round tank. The sensor cable is laid in loops and leads to a measuring unit 24. The cable may also be laid in narrower or wider loops or in a circular shape.

Access channels 26 are preferably formed in the compensation layer. Through these channels, leaking medium which has penetrated through the intermediate floor is guided to the drainage tubes or the sensor cable.

Figure 4:
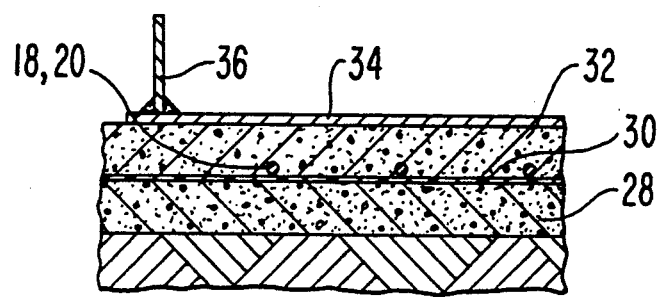
FIG. 4 is a schematic view of a flat bottomed tank resting on a foundation incorporating sensor cables.

FIG. 4 shows a cross-section through a layer construction to be installed underneath a flat bottomed tank.

At first, a layer of sand or special asphalt 28 is applied onto the foundation supporting the tank. A film 30 which is impermeable to the leaking medium is laid out on this asphalt layer 28. The film 30 prevents the leaking medium from entering the ground and collects the medium. Drainage tubes 20 housing the sensor cables 18 are laid on top of the film 30. The drainage tubes lie in pre-formed canals in the liquid-permeable compensation layer 32. This layer may, for example, consist of drainage asphalt or gravel. The sensor cables are state of the art cables which change their electrical properties when in contact with the leaking liquid. They are available from W. L. Gore & Associates, Inc., under the trademark of LEAKLEARN and are preferably of the type described in U.S. Pat. No. 4,206,632.

The tank with tank bottom 34 and tank walls 36 rests on the compensation layer 32. The film is pulled up at the sides and attached to the tank walls or similar, where it acts as a catch basin.

In order to modify a flat bottomed tank already installed, the tank is lifted off the ground, cleaned and sandblasted. The compensation layer 28 and the film 30, preferably consisting of polyethylene, are fitted on top of the existing foundation supporting the tank. The drainage tubes 20 housing the sensor cable 18 are laid on top of the film, then the intermediate layer 32 is applied. After solidification of the compensation layer 32, the flat bottomed tank is re-installed on the modified foundation.

Of course the described process can be modified. For instance, the sensor cables 18 need not lie directly on the barrier film or barrier layer 30 in every case; they may just as well be in direct contact with the tank bottom. In this case, they will react to leakages earlier. However, the barrier layer does not have a concentration and collection effect and as a result the cable must be laid in narrower loops.

We claim:

1. A flat bottomed tank provided with an outer tank bottom and an inner tank floor in a chamber having an assembly of layers located between said tank bottom and inner tank floor, said assembly comprising:
   (a) a bitumen layer arranged adjacent to the outer tank bottom;
   (b) a barrier film which retains a leaking medium and which is applied on top of the bitumen layer; and
   (c) a liquid-permeable compensation layer on top of the barrier film and in which a sensor cable whose electrical properties change when in contact with the leaking medium is laid out horizontally.

2. A flat bottomed tank according to claim 1, wherein the sensor cable is laid in grooves or canals which are formed within the compensation layer.

3. A flat bottomed tank according to claim 1, wherein the sensor cable is laid in sturdy, perforated protective tubes.

4. A flat bottomed tank according to claim 1, wherein access channels are provided within the compensation layer in order to guide the leaking medium to the sensor cable.

5. A flat bottomed tank according to claim 1, wherein the sensor cable is laid directly onto the barrier layer which is retaining the leaking medium.

6. A flat bottomed tank according to claim 1, wherein the inner tank floor consists of individual lengths which are joined by welding in such a way that they overlap.

7. A flat bottom tank according to claim 1, wherein the barrier film is in the form of a barrier coating which is impermeable to the leaking medium.

8. A flat bottom tank according to claim 1, wherein the liquid-permeable compensation layer on top of the barrier film is porous bitumen.

* * * * *

UNITED STATES PATENT AND TRADEMARK OFFICE
CERTIFICATE OF CORRECTION

PATENT NO. : 5,269,173

DATED : December 14, 1993

INVENTOR(S) : Klaus Henneck, Hans Baumgartner

It is certified that error appears in the above-identified patent and that said Letters Patent is hereby corrected as shown below:

On the title page, item (30):

Foreign Application Priority Data, the German priority number which now is identified as "015190" should be corrected to read --4015190--.

Signed and Sealed this

Seventh Day of June, 1994

Attest:

BRUCE LEHMAN

*Attesting Officer*     *Commissioner of Patents and Trademarks*